Sept. 7, 1943. A. C. BURLEIGH 2,328,613
ABRADING AND POLISHING DEVICE
Filed May 2, 1940 3 Sheets-Sheet 1
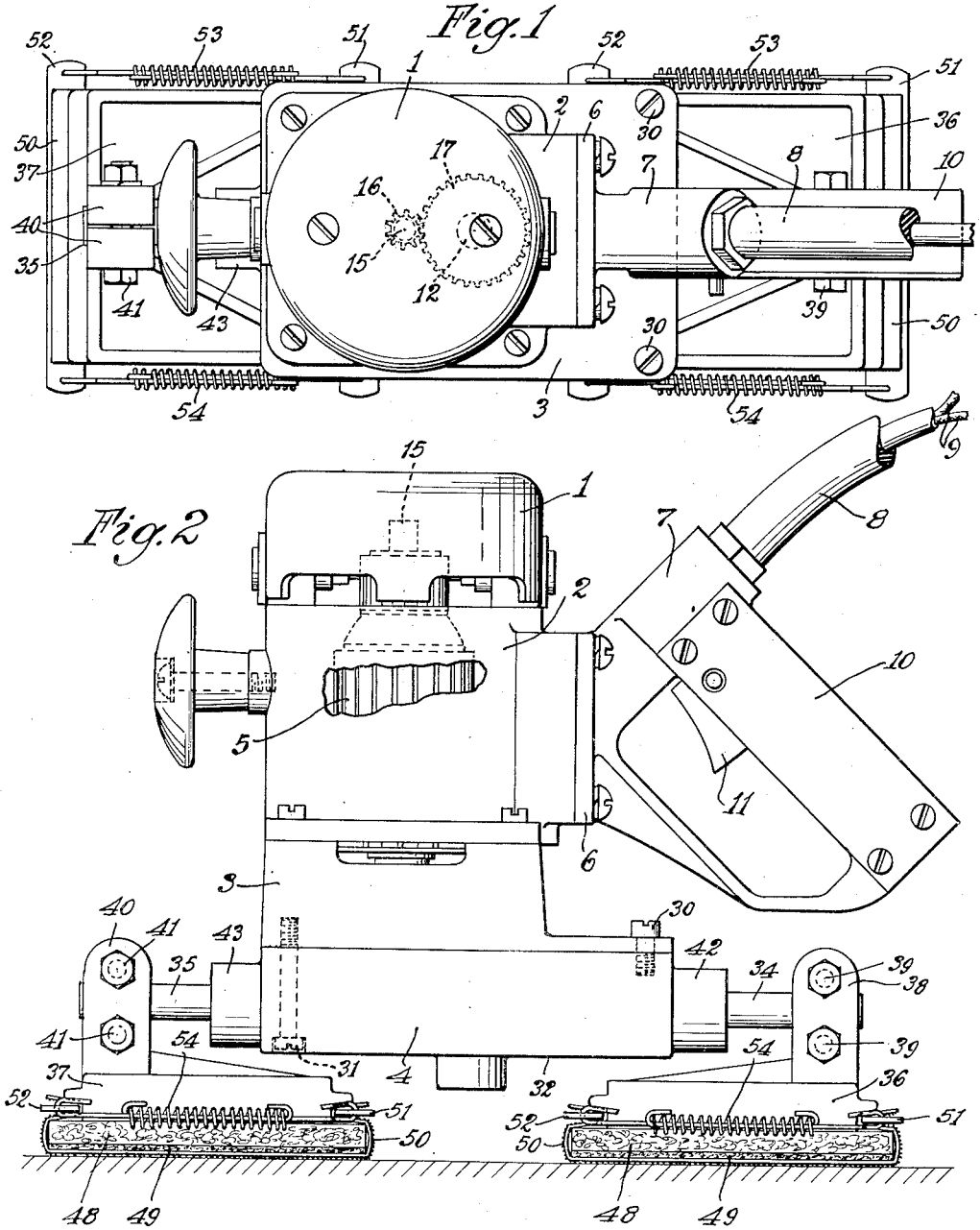
Inventor
Arthur C. Burleigh
by Parker & Carter
Attorneys.

Sept. 7, 1943. A. C. BURLEIGH 2,328,613
ABRADING AND POLISHING DEVICE
Filed May 2, 1940 3 Sheets-Sheet 2
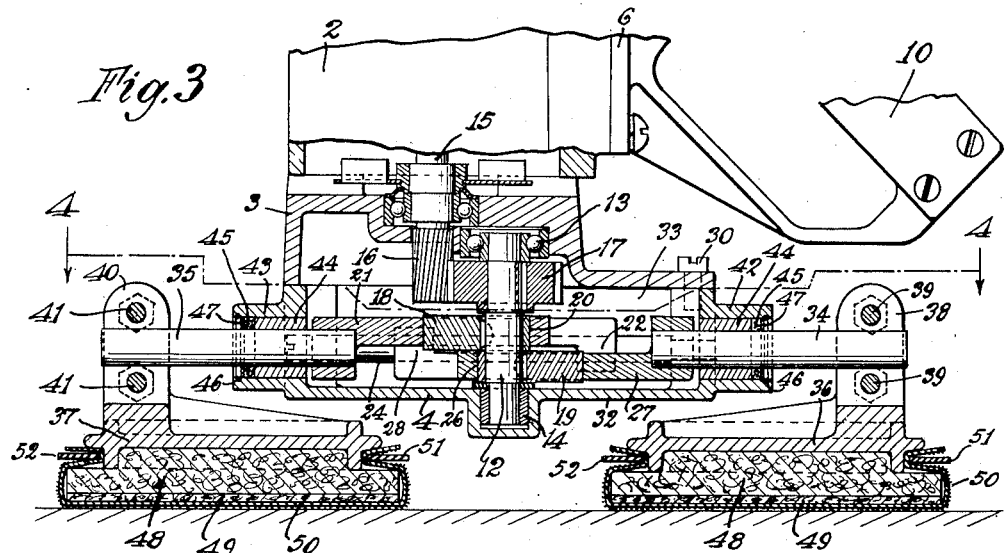
Inventor
Arthur C. Burleigh
by Parker Carter
Attorneys Sept. 7, 1943.  A. C. BURLEIGH  2,328,613
ABRADING AND POLISHING DEVICE
Filed May 2, 1940  3 Sheets-Sheet 3
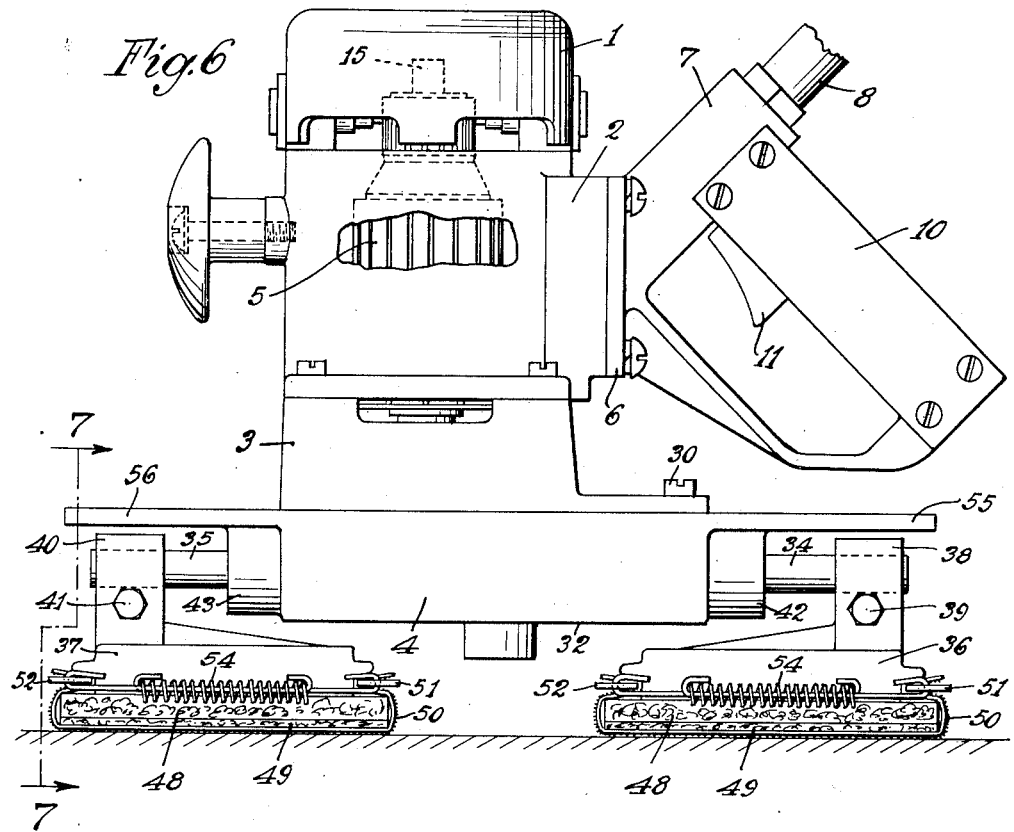
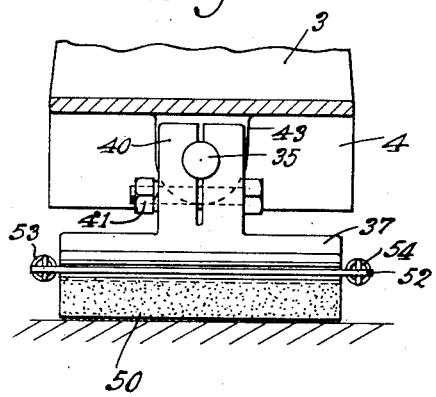
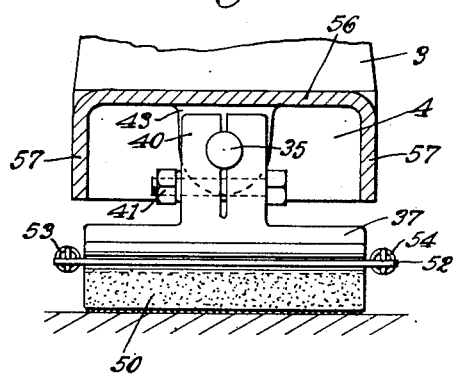
Inventor
Arthur C. Burleigh
by Parker & Carter
Attorneys Patented Sept. 7, 1943

2,328,613

UNITED STATES PATENT OFFICE 2,328,613

ABRADING AND POLISHING DEVICE

Arthur C. Burleigh, Wellesley, Mass., assignor to Skilsaw Inc., Chicago, Ill., a corporation of Delaware Application May 2, 1940, Serial No. 332,865

4 Claims. (Cl. 51—170)

This invention relates to abrading and polishing devices and has for its object to provide a new and improved device of this description.

The invention has as a further object to provide an abrading and polishing device with one or more reciprocating abrading members. The invention has as a further object to provide an abrading and polishing device with one or more members which can be easily and quickly changed from an abrading member to a polishing member and vice versa.

The invention has further objects which are more particularly pointed out in the accompanying description.

Referring to the accompanying drawings, Fig. 1 is a plan view of one form of device embodying the invention;

Fig. 2 is a side view of the device shown in Fig. 1;

Fig. 3 is a side view of the lower portion of the device illustrated in Fig. 2, in part section;

Fig. 4 is a sectional view taken on line 4—4 of Fig. 3;

Fig. 5 is an enlarged sectional view taken on line 5—5 of Fig. 4;

Fig. 6 is a side elevation showing a construction where there is a protecting shield for the abrading and polishing members;

Fig. 7 is a sectional view taken on line 7—7 of Fig. 6; and

Fig. 8 is a view similar to Fig. 7, showing a further modified construction of the protecting shield.

Like numerals refer to like parts throughout the several figures.

Referring now to the drawings, the device is provided with a casing consisting of the separate sections 1, 2, 3 and 4. Within the section 2 is a motor 5. Section 2 is also provided with a handle member 6 removably connected thereto and which is provided with a hollow portion 7 having the insulated cable 8 for the electrical conductors 9 for the motor 5. The handle member 6 is also provided with a handle 10 containing an electric switch actuated by the movable actuating member 11, so that when the handle is grasped, the actuating member may be easily moved to its closed or open position. There is a spring which moves it to its open position.

There is a driven shaft 12 which has one end mounted in a bearing 13 in the section 3 of the casing and the other end mounted in a bearing 14 in the section 4 of the casing. There is a driving connection between the armature shaft 15 and the driven shaft 12, the armature shaft having a toothed member 16 which engages with the toothed member 17 on the driven shaft 12. The shaft 12 is provided with two eccentrics 18 and 19, one above the other, the eccentrics being connected with the shaft so as to rotate therewith and being preferably arranged with their greatest radii substantially one hundred and eighty degrees apart. The eccentric 18 works in an elongated opening 20 in a reciprocating member 21, which opening preferably has one dimension substantially the same as the complete diameter of the eccentric 18 and the other dimension at right angles thereto, considerably larger so that the eccentric may freely move around therein when the driven shaft 12 is rotated. The reciprocating member 21 has two separated guiding members 22 and 23 which engage and slide on the guides 24 and 25 attached to the section 4.

The eccentric 19 is in an opening 26 in the reciprocating member 27, which is similar to the opening 20 in the reciprocating member 21. The reciprocating member 27 is provided with two separated guiding members 28 and 29 which engage and slide along the guides 24 and 25.

The sections 3 and 4 of the casing are hollow and are fastened together by the fastening devices 30 and 31. The section 4 is provided with a bottom 32 so that the sections 3 and 4 together form a chamber 33 in which the shaft 12 and the driving connection from the shaft 12 to the motor shaft 15, the eccentrics 18 and 19, the reciprocating members 21 and 27, the guides 24 and 25 and the guiding members 22, 23, 28 and 29 are located. Removably connected with the reciprocating members 21 and 27 by fastening devices 34a and 35a are the reciprocating actuating parts 34 and 35, which are removably connected to the abrading and polishing members 36 and 37. As herein shown, the abrading and polishing member 36 is provided with the upstanding parts 38 which are recessed to receive the part 34, the upstanding parts 38 being clamped together by means of the bolts 39. The abrading and polishing member 37 is provided with similar upstanding parts 40 to which the part 35 is clamped by means of the bolts 41. The chamber 33 preferably contains oil for the moving parts and the parts 34 and 35 pass through stuffing boxes 42 and 43, arranged to permit the parts 34 and 35 to reciprocate without the escape of the oil in the chamber 33.

In the particular construction shown, each of the members 34 and 35 is provided with a bushing 44 and a packing ring 45, there being a locking spring 46 which acts to hold the packing ring in position, these locking springs fitting into grooves in the parts 42 and 43. There are washers 47 between the springs 46 and the packing rings 45. The abrading and polishing members 36 and 37 are provided with felt pieces 48 and polishing members 49 which are brought into contact with the surface to be polished when polishing is desired. When it is desired to abrade the surface, an abrading sheet 50 is placed around the members 36 and 37 and is held in place by the holding pieces 51 and 52 which are connected together by the springs 53 and 54.

It sometimes happens that it is desirable to have a protecting shield for the abrading and polishing members 36 and 37 which are moved back and forth, so as to more or less cover them in order to prevent injury to the operator of the machine and anyone who is in proximity thereto. In this form of the device the abrading and polishing device may be of the same construction as that shown in the other figures except that there are protecting shields 55 and 56 which extend out from the section 4 over the top of the abrading and polishing members 36 and 37. These protecting shields preferably extend out so as to substantially cover these abrading and polishing members 36 and 37 when they are projected outwardly their maximum distances. In Figs. 6 and 7 the protecting shield simply extends across the top of the abrading and polishing members 36 and 37. In some cases it is desirable to have this protecting shield also provided with the inwardly extending parts 57 so as to more or less enclose the working parts, as shown in Fig. 8. It will be seen that by means of this protecting device the movably abrading and polishing members 36 and 37 are covered in substantially all of their various positions so that they cannot strike the operator or any person standing close to the machine when it is being operated.

One of the important features of this construction is that there is a short driven shaft in the oil reservoir and the abrading or polishing member or members are connected to this shaft so that there will be no leakage of oil due to this connection. It will further be noted that this short shaft in the oil reservoir has its driving connection to the reciprocating abrading or polishing member at a point intermediate its ends.

I claim:

1. An abrading and polishing device comprising a frame, the lower part of the frame being a hollow oil reservoir, a motor mounted in said frame above the oil reservoir, a driving device projecting into the oil reservoir and operatively connected with said motor, an eccentric mounted on said driving device, a reciprocating member having an elongated opening into which said eccentric is received, two guide rods in said oil reservoir, one on each side of said eccentric, two guiding members integral with said reciprocating member, having openings into which the guides are received, a reciprocating actuating part connected with said reciprocating member and projecting through an opening in said oil reservoir, and an abrading or polishing member connected with said reciprocating actuating part.

2. An abrading and polishing device comprising a frame, the lower end of the frame being a hollow oil reservoir, a motor mounted in said frame above the oil reservoir, a shaft in the oil reservoir and operatively connected with said motor, a bearing in the bottom of said oil reservoir into which the end of said shaft projects, an eccentric disc mounted in a fixed position on said shaft, a reciprocating member having an elongated opening into which said eccentric disc is received, the periphery of said disc engaging the wall of said elongated opening so as to reciprocate said reciprocating member when the shaft is rotated, said reciprocating member having a guiding member, a guide along which said guiding member moves, a reciprocating actuating part connected with said reciprocating member and projecting through an opening in said oil reservoir, an abrading or polishing member connected with said reciprocating actuating part, a bushing connected with said oil reservoir through which the reciprocating actuating part passes.

3. An abrading and polishing device comprising a frame, a motor mounted in said frame, two reciprocating abrading or polishing members, two overlapping reciprocating actuating members extending laterally from said frame and connected to said reciprocating abrading or polishing members, an oil reservoir forming the lower part of said frame, a shaft in said oil reservoir operatively connected with said motor and having a bearing at opposite ends thereof located in the oil reservoir, two discs having eccentric openings therein connected with said shaft between said bearings, said overlapping actuating members having elongated openings therein into which said discs are received, the peripheries of said discs engage the walls of said elongated openings, guiding members located in said oil reservoir and fixed to said frame on opposite sides of said shaft, each of said overlapping reciprocating actuating members being provided with two engaging parts which engage said guides.

4. An abrading and polishing device comprising a frame, a motor mounted in said frame, the lower part of the frame being a hollow oil reservoir, two reciprocating abrading or polishing members, two reciprocating actuating members, one connected with each of said abrading or polishing members, each consisting of two sections, one of which is cylindrical and the other of which is flat, the two sections of each reciprocating actuating member being removably connected together, each of said flat sections being provided with elongated openings, two guides in said oil reservoir, two engaging members on each of said flat sections which engage said guides, a single shaft in said oil reservoir which extends through said elongated openings, and engaging means on said single shaft for engaging both of said flat sections so as to move the reciprocating actuating members in opposite directions.

ARTHUR C. BURLEIGH.